Dec. 18, 1962     J. W. BORGER     3,069,206
CONTAINER FOR PULVERANT MATERIAL AND METHOD
AND APPARATUS FOR UNLOADING SAME
Filed March 2, 1959     7 Sheets-Sheet 5
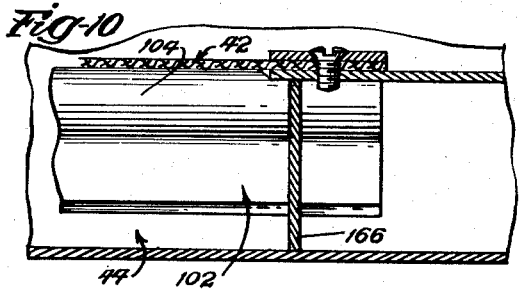
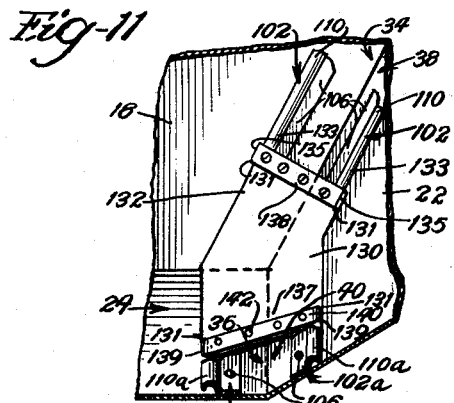
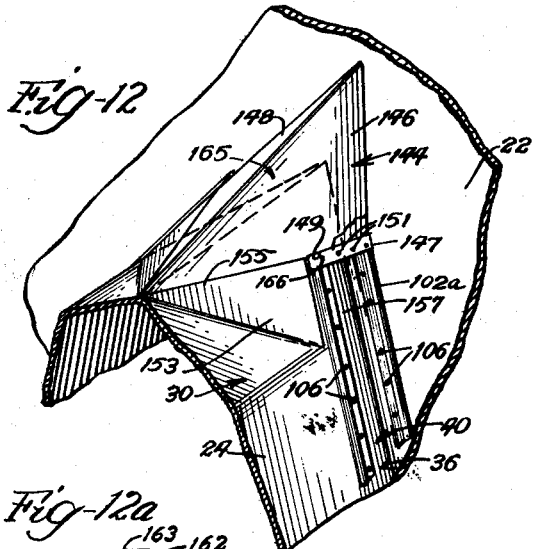
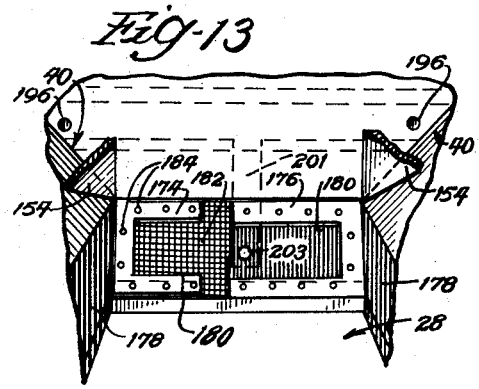
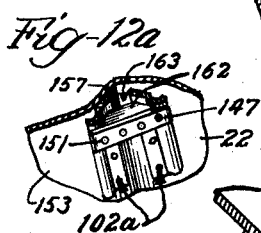
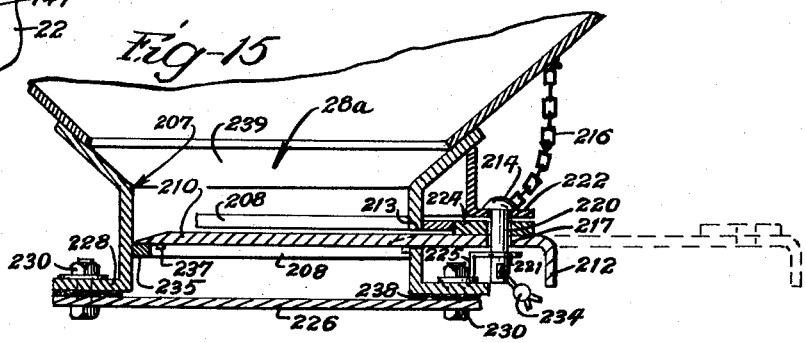
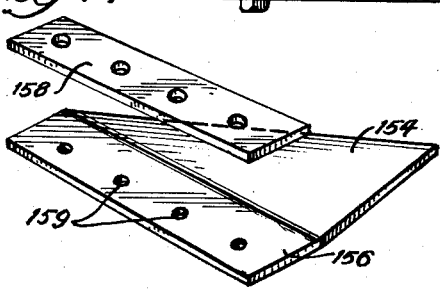
INVENTOR.
Jack W. Borger
BY
Mann, Brown & McWilliams
Attys.

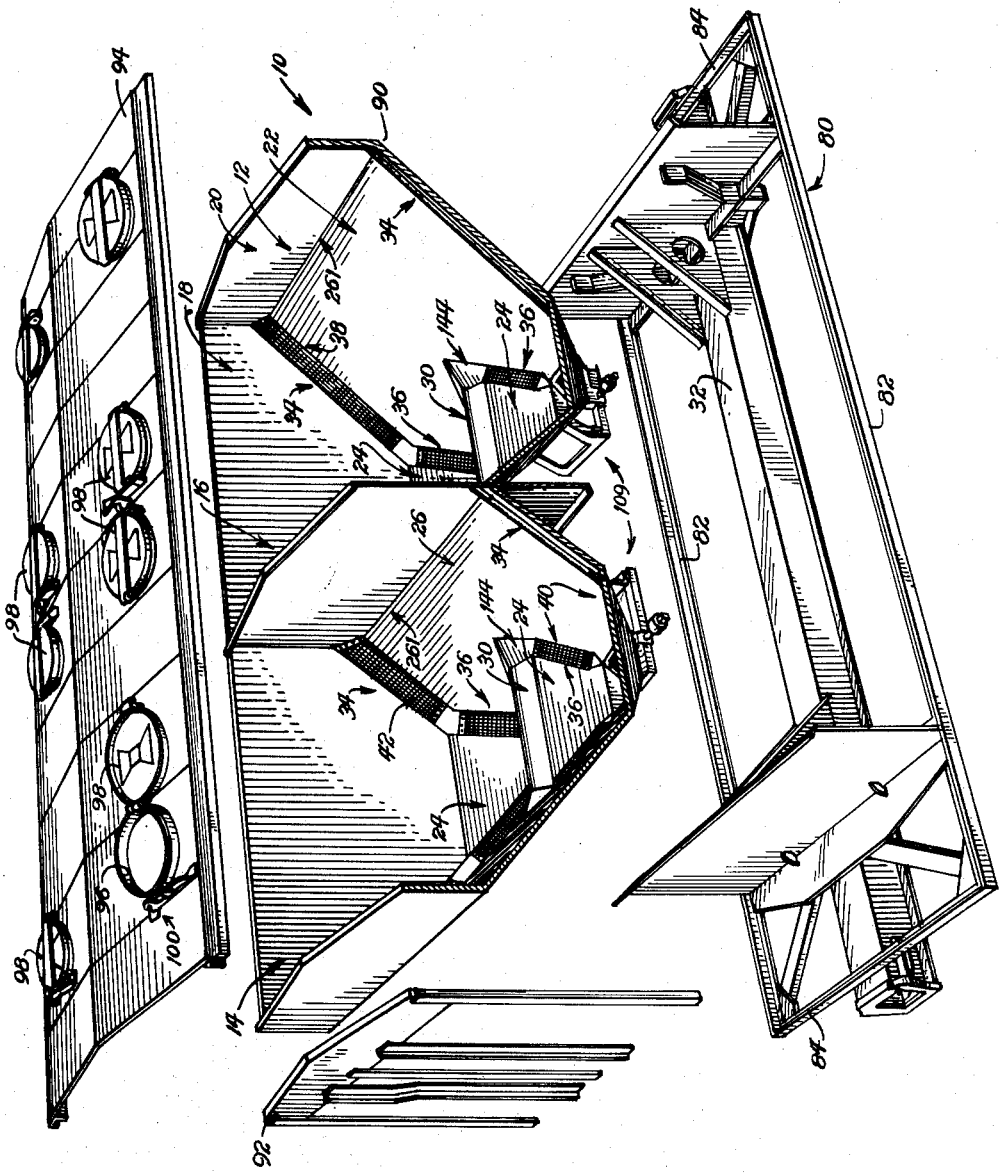

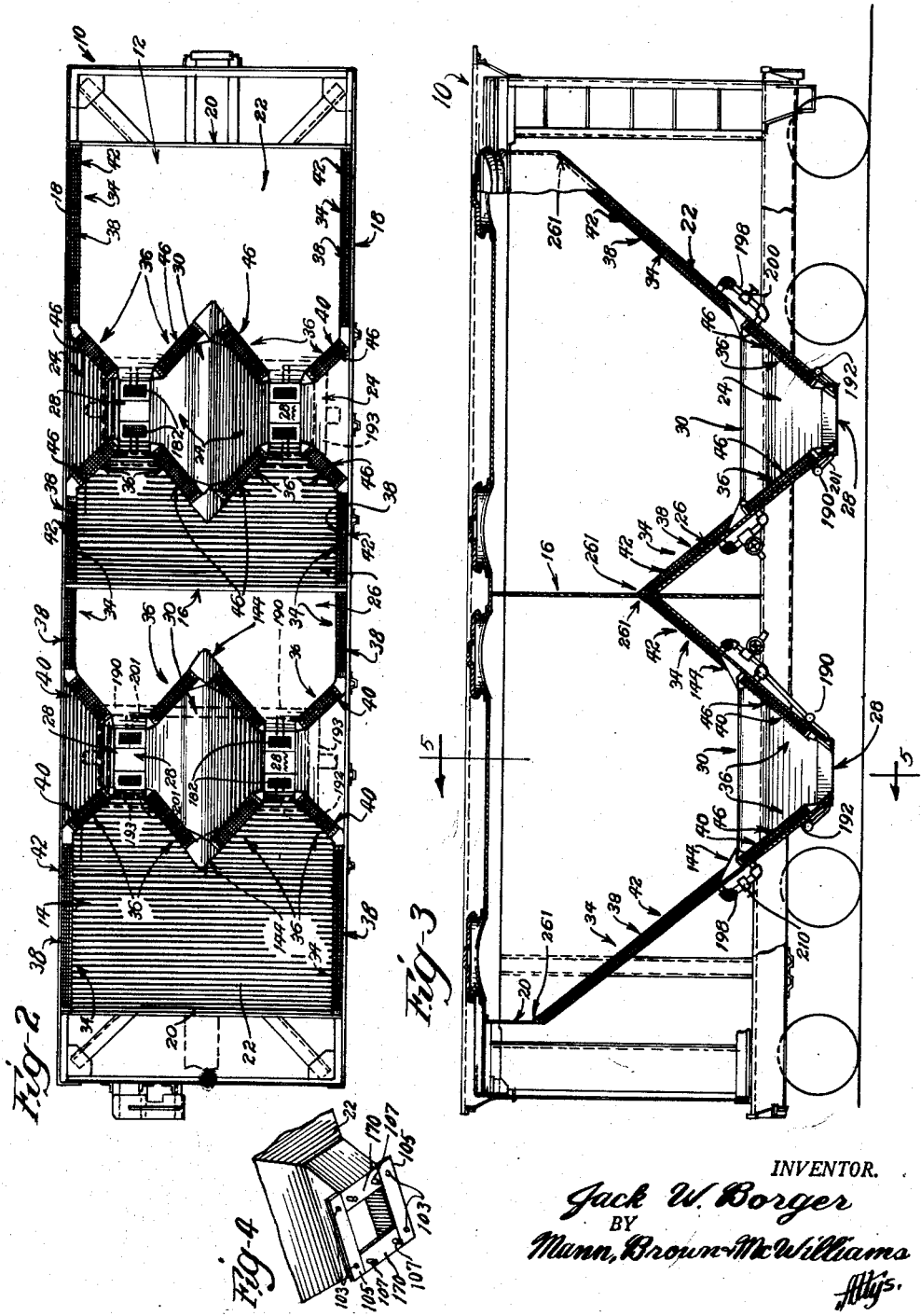

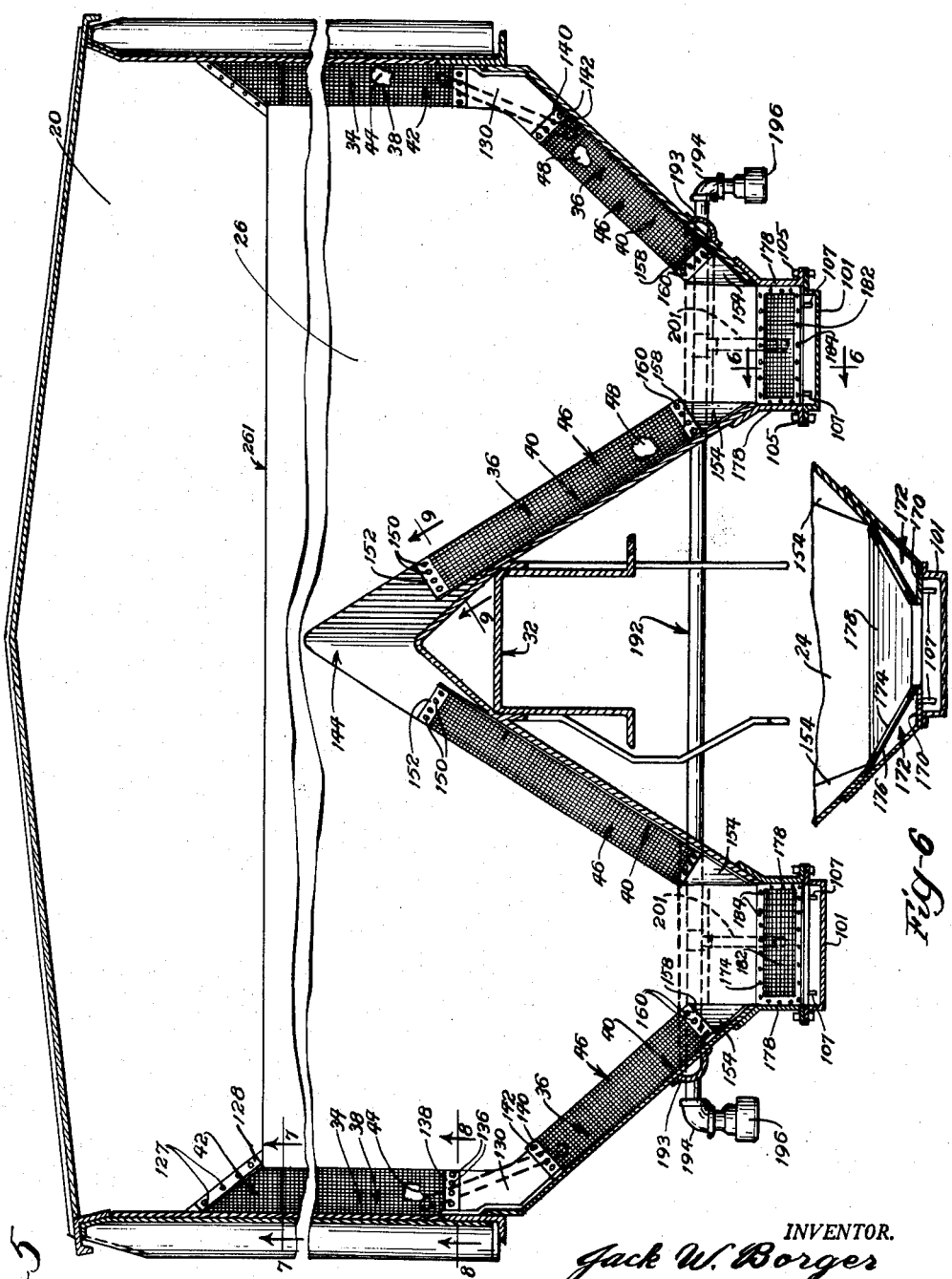

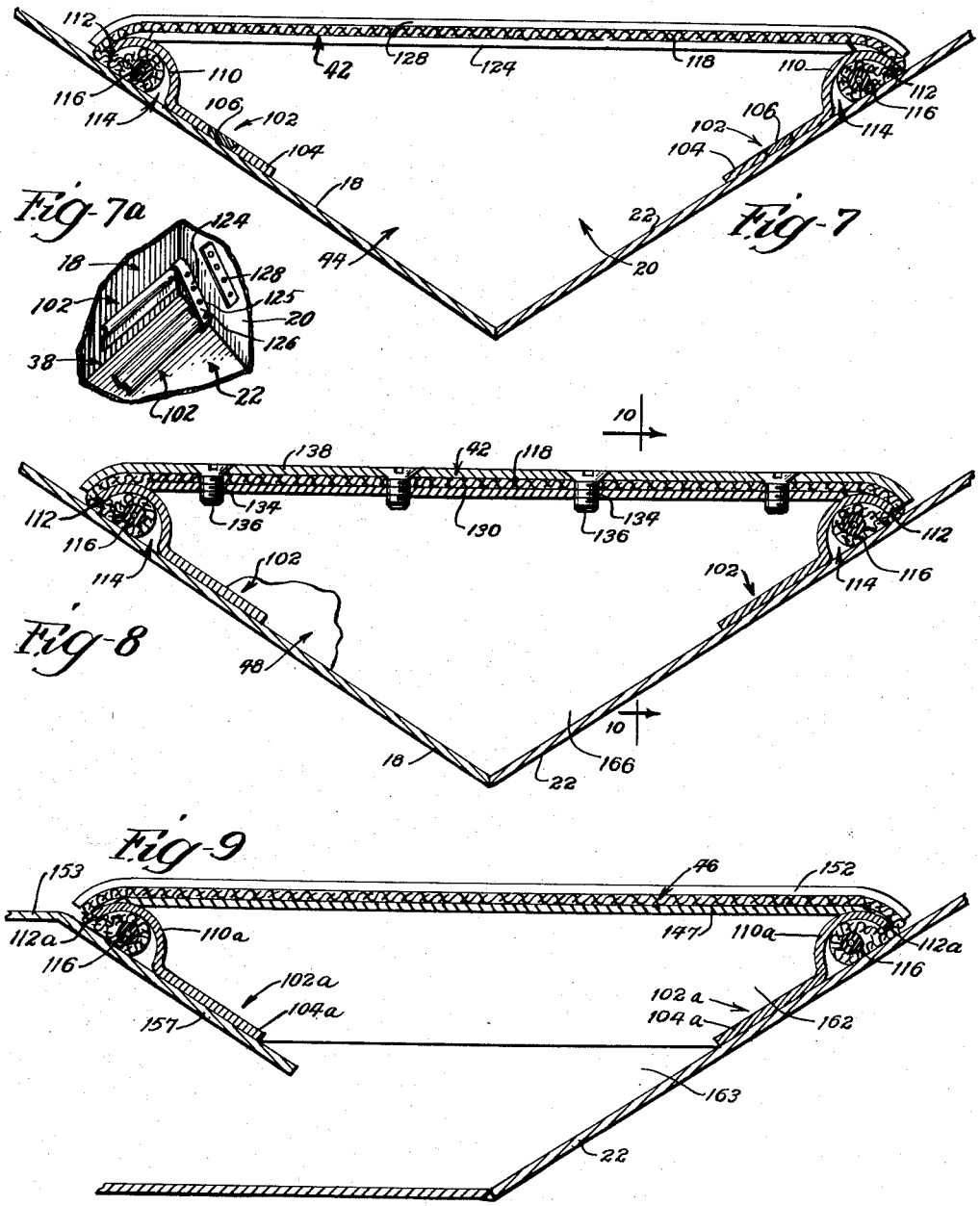

Dec. 18, 1962 J. W. BORGER 3,069,206
CONTAINER FOR PULVERANT MATERIAL AND METHOD
AND APPARATUS FOR UNLOADING SAME
Filed March 2, 1959 7 Sheets-Sheet 6
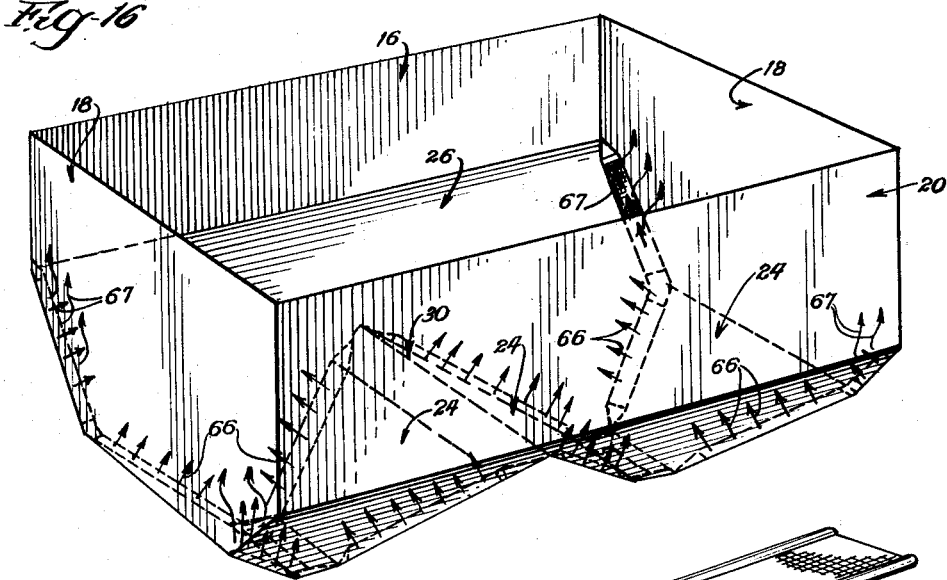
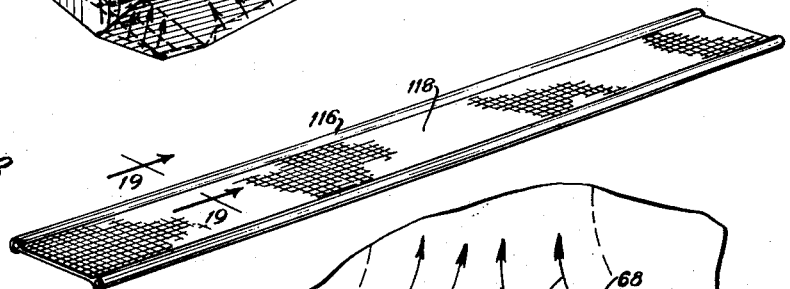
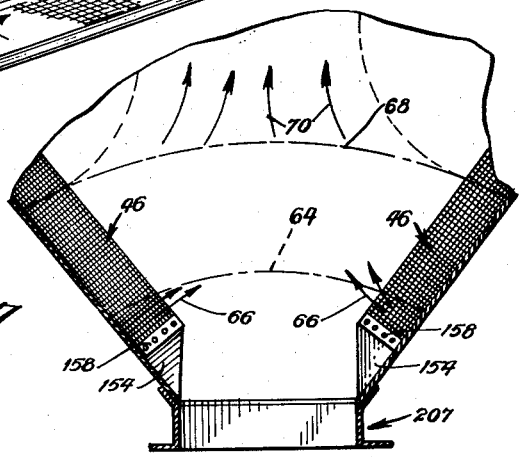
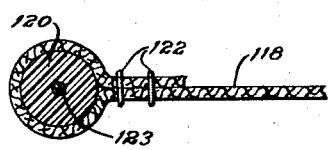
INVENTOR.
Jack W. Borger
BY
Mann, Brown & McWilliams
Attys.

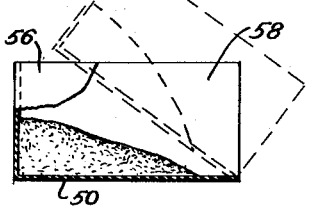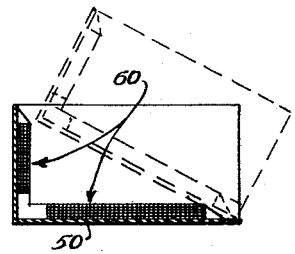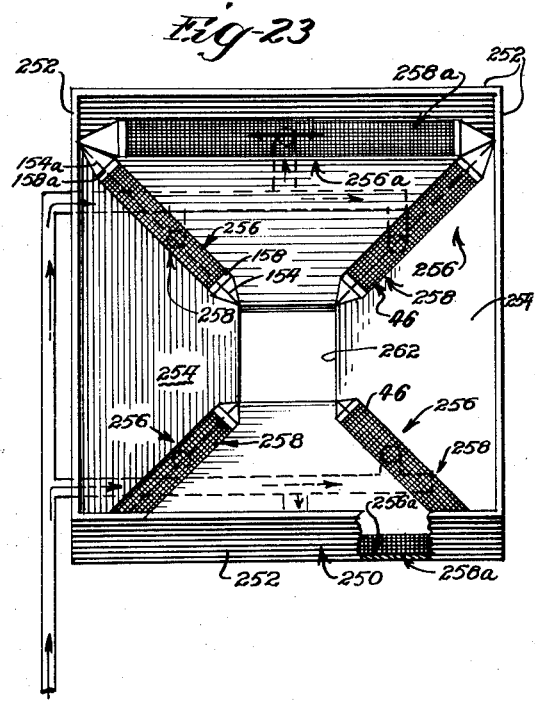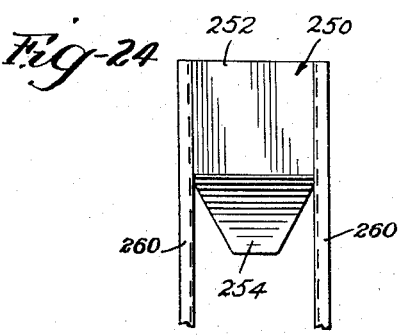

3,069,206
CONTAINER FOR PULVERANT MATERIAL AND METHOD AND APPARATUS FOR UNLOADING SAME
Jack W. Borger, Calumet City, Ill., assignor to Pullman Incorporated, a corporation of Delaware
Filed Mar. 2, 1959, Ser. No. 796,603
18 Claims. (Cl. 302—52)

This invention relates to the removal of pulverant material from storage bins, and more particularly, to a railway car adapted to carry such pulverant material and have it discharged therefrom.

Pulverant material such as flour, cement, and lime, has always presented a problem in being discharged from a storage hopper or bin because of its tendency to compact and the natural adherence between the pulverant particles. The problem is accentuated in the case of transportation of pulverant material, because the jarring action during transit produces severe compacting, with the result that discharge from the vehicle, even through bottom openings, is faulty and sporadic due to the arching or vaulting of the compacted mass between the walls of the container.

A simple experiment demonstrates the nature of the problem: If pulverant material is heaped upon a flat sideless horizontal surface and that surface is then raised so as to be inclined to the horizontal, it will be found that at some given angle the pulverant material will readily slide from the surface. For convenience of terminology, this will be called the angle of slide and it exceeds the angle of repose of the pulverant material. If the same experiment is repeated, but in this instance using vertical side walls on the plate that is inclined, and using sufficient pulverant material to have substantial contact with the vertical side walls, it will be found that the plate being inclined must be raised to a substantially steeper angle before the pulverant material will slide freely from that surface.

This invention has for its principal object the provision of means which will enable pulverant material to be contained or supported by or on inclined hopper surfaces, which may be disposed substantially at the angle of slide and bounded by intersecting upright retaining or side walls and discharge through a bottom opening just as freely as if the retaining or side walls were not present.

There have been many attempted solutions to the problem, including the use of mechanical devices to vibrate the bins or containers in order to shake the pulverant material loose, or to mechanically agitate the pulverant material so that it will fall freely through a bottom opening.

Attempts have also been made to use jets of air through the bottom or side walls of the bin or container in order to aerate the pulverant mass, but almost invariably such attempts have failed because the air jets merely bore an opening through the pulverant material without releasing the compacted mass for free flow of the material to the opening.

Still another attempt at solving the problem has been to provide an inclined air fluidizing conveyor that forms a sloping bottom wall of the container so that, as the pulverant material falls or is delivered to such conveyor, the conveyor aerates, or diffuses air into the material to fluidize the portion of it that is adjacent the conveyor, which, in a sense, provides a frictionless surface for the pulverant mass to move toward the discharge opening. The air fluidizing conveyor usually takes the form of a plenum chamber, the face of which adjacent to the pulverant material is of porous material that permits air to seep through such face and diffuse into the pulverant material to provide the aeration deemed necessary.

When the air fluidizing type of conveyor is used in the transportation of pulverant material, the railway car or other vehicle must be specially designed for the use of the air conveyor, and can only be used for pulverant material, because any other kind of bulk material of coarser grain or particle size would not satisfactorily travel along the conveyor.

Another object of the present invention, therefore, is to use standard hopper cars of the type in use on the railroads today, and adapt them for transportation of pulverant material, with simple and adequate means for discharging the pulverant material from the car.

Basically, I have found that I can fully discharge pulverant material from a standard hopper car, in which the slope sheets are conventionally at a steep angle, by merely providing band-like air injection or air blast devices at corner intersections, and then, ordinarily, only the corner intersections that are inclined to the vertical, to subdivide or segregate the pulverant material into freely moving pulverant material flows that eliminate the tendency of the pulverant material to vault or arch as it approaches the hopper outlet, and that avoid the resistance to flow that pulverant material has heretofore experienced at corner intersections and along upright side walls. Preferably, this is accomplished by providing at said corners or corner intersections a rapid flow of air upwardly, which serves the purpose of physically moving upwardly and toward the center of the hopper the strata of pulverant material in the path of the respective air flows to define swaths through the pulverant material that separate or segregate converging pulverant material flows into said freely moving flows. The air flows or blasts will result in the enlarging and destroying of any arch formed by the pulverant material across the hopper opening and also, if certain of said devices are appropriately located, in the cutting or slicing of said material away from upright side walls. In doing this, I have found that the car slope sheets should be at angles substantially equal to the angle of slide previously mentioned, and, of course, if the angle is steeper the problem is even more easily solved.

The arching or vaulting of compacted pulverant material in bins has long been recognized as the reason for the difficulty in discharging such material from a bin or other container, and in my solution I have found that by directing a band-like air flow diagonally from inclined corner intersections of hoppers formed from planar sheets, the base of the arch will be destroyed and the pulverant material will completely discharge through the bin or hopper bottom discharge openings.

Another object of the invention, therefore, is to provide a simple, inexpensive means for collapsing the arching or vaulting of compacted pulverant material in a bin or other container, which means uses a minimum of parts and may be easily installed in existing bins or hoppers or, in the case of railway cars, in existing hopper cars.

Obviously, in some instances the air treatment of the mass may be along intersections of vertical walls with continuing inclined walls; i.e., in which the line of intersection is horizontal. Also, in some instances it may be desirable to apply the air sequentially with lower portions of the mass being subjected to the agitating air treatment before the higher sections of the mass are similarly treated in order to get greater penetration of the air through the mass and prevent premature formation of air channels along the wall intersections that would destroy the action that is desired. These modifications are also within the purview of this invention.

Preferably, the air treatment at the corner intersections referred to above is accomplished by use of canvas, fine screening, or other porous material secured across the corner intersections, with the space between the porous material and the corner intersections constituting a plenum chamber suitably fed by air or other appropriate gas under pressure.

Further and other objects and advantages of the invention will be apparent as the disclosure proceeds and the description is read in conjunction with the accompanying drawings, in which:

FIGURE 1 is an exploded perspective view of a hopper car to which my invention has been applied, parts being omitted or broken away for clarity of illustration;

FIGURE 2 is a plan view of the relevant components of the car shown in FIGURE 1, the roof structure being omitted for clarity of illustration;

FIGURE 3 is a longitudinal vertical sectional view of the railroad car of FIGURE 2;

FIGURE 4 is a fragmental perspective view of one of the hopper discharge ports employed in the embodiment of FIGURES 2 and 3;

FIGURE 5 is a cross-sectional view along line 5—5 of FIGURE 3, on an enlarged scale and parts being broken away;

FIGURE 6 is a fragmental cross-sectional view along line 6—6 of FIGURE 5;

FIGURES 7, 8 and 9 are enlarged fragmental cross-sectional views approximately along line 7—7, 8—8 and 9—9 of FIGURE 5, but taken perpendicularly of the car slope sheets;

FIGURE 7a is a fragmental perspective view illustrating a structural detail at a corner formed by a side wall, end wall (or central partition) and slope sheet of the car of FIGURES 1–5;

FIGURE 10 is a cross-sectional view along line 10—10 of FIGURE 8;

FIGURE 11 is a fragmental perspective view of one of the intersecting corners best shown in FIGURE 1, the gas permeable material being omitted for clarity of illustration;

FIGURE 12 is a fragmental perspective view of a portion of the center sill ridge in the railroad car of FIGURES 1–3, illustrating my invention applied thereto, the gas permeable material being omitted for clarity of illustration;

FIGURE 12a is a fragmental perspective view illustrating a structure detail in the arrangement of FIGURE 12;

FIGURE 13 is a fragmental perspective view of one of the hopper openings in the embodiment of FIGURE 1–5;

FIGURE 14 is an exploded perspective view of a triangular adaptor plate and securing strip employed adjacent the hopper openings of the railroad car shown in FIGURES 1–3;

FIGURE 15 illustrates an improved form of hopper opening closure gate in accordance with my invention, it being a view similar to that of FIGURE 6;

FIGURE 16 is a diagrammatic perspective view in outline form illustrating approximately what takes place when the pulverant material discharge device of my invention is actuated;

FIGURE 17 is a diagrammatic cross-sectional view through a hopper opening, illustrating the air flow action that takes place on initiation of the pulverant material discharge operation, and its effect on the pulverant material;

FIGURE 18 is a perspective view of a preferred form of gas permeable material employed in practicing my invention;

FIGURE 19 is an enlarged fragmental cross-sectional view along line 19—19 of FIGURE 18;

FIGURES 20–22 are diagrammatic elevational views illustrating the basic reasoning behind my invention;

FIGURE 23 is a plan view, partially in perspective, of a stationary hopper to which my invention has been applied; and FIGURE 24 is a side elevational view of the hopper shown in FIGURE 23, showing same mounted on suitable supports.

*General Description*

Reference numeral 10 of FIGURES 1–3 generally indicates a railroad car to which my invention has been applied. The railroad car 10, aside from the inventive concepts herein disclosed, is essentially the same as the PS–2 covered hopper car made and sold by Pullman-Standard a division of Pullman Incorporated. As shown in FIGURE 1, the car 10 is formed into two compartments 12 and 14 separated by a partition 16 which forms a side sheet of each compartment. The compartments are also defined by the car side walls 18, the car end walls 20 which merge into sloping floor sheets 22, and hopper sheets 24. Floor sheets 26 extend between the partition 16 and the hopper openings 28 (see FIGURES 2 and 3), to which the hopper sheets 24 and floor sheets 22 also converge. The floor sheets 22 and 26, and hopper sheets 24 of each compartment define hopper funneling portions including downwardly inclined bottom surfaces that lead to and converge at two ports 28 on either side of center sill ridge 30 that is formed in the hopper structure of car 10 to accommodate center sill 32 of the railroad car.

The walls 18 and sheets 22, 24 and 26 form downwardly inclined lines of intersection where indicated by the arrows 34 and 36, respectively. These lines of intersection form corners 38 and 40 to which my invention has been applied in the car 10.

In accordance with my invention, corners 38, which incline downwardly along the sides of the car on each side of the compartments 12 and 14, are covered with a gas permeable material 42 to form a plenum chamber 44 which is connected to a suitable source of gas, such as air under pressure. Similar strips of gas permeable material 46 are applied across corners 40 to form plenum chambers 48 which are also connected to a suitable source of gas under pressure.

I have found that when car 10 is loaded with pulverant material such as flour, it is readily and completely discharged by supplying air under pressure to plenum chambers 44 and 48. The gas permeable strips 42 and 46 in accordance with this invention are made sufficiently permeable to emit a band-like air flow of substantial volume rate which acts on the pulverant material to break it up by forming intersecting swaths through it to define freely moving pulverant material flows, and also overcome any friction the pulverant material may have with the side wall surfaces of the railroad car hopper structure that might impede the flow of the pulverant material from hopper ports or openings 28.

A further aspect of the improvement provided by my invention is graphically illustrated in the diagrammatic FIGURES 20, 21 and 22. FIGURES 20 and 21 illustrate the experiment referred to above, reference numeral 50 indicating a flat, sideless, horizontal plate to which a quantity of pulverant material 52, such as flour, has been applied. By elevating one end 54 of plate 50 to the so-called angle of slide, the pulverant material 52 will slide off of plate 50. However, if sides 56 and 58 (see FIGURE 21) are applied to the plate 50, it will be found that the plate 50 must be inclined at a greater angle before the pulverant material will slide freely from plate 50. By employing strips of gas permeable material across the corners 60 on either side of the plate 50, as indicated in FIGURE 22, and supply gas (such as air) under pressure to the chambers defined by the gas permeable material as the plate 50 is elevated, it will be found that the plate 50 need only be elevated to the angle of slide required by the sideless plate of FIGURE 20. The gas under pressure emitting from the gas pulverant strips 60 breaks up the pulverant material that tends to compact in the corners 60 and, in tending to rise between the pulverant material and the sides 56 and 58, overcomes the friction offered by the sides 56 and 58; the gas, in effect, slices the pulverant material from these upstanding walls. This reduces the frictional drag on the pulverant material to that encountered without side walls.

The principles illustrated in FIGURES 20–22 are inherent in the operation of the invention as applied to hopper car 10.

Preferably the arrangement of car 10 is such that in operation the plenum chambers 48, which converge toward the hopper openings 28, are simultaneously supplied with air under pressure when it is desired to remove the pulverant material from a compartment 12 or 14. The plenum chambers 44 along the sides of the car are preferably supplied with air after the plenum chambers 48 receive their supply to obtain a sequential operation somewhat as follows.

When the hopper ports 28 are initially opened, a portion of the pulverant material will drop out through the individual hopper openings of the respective hopper funneling portions to form an arch across the respective openings somewhat as shown by the dashed line 64 of FIGURE 17. Thus, most of the flour will remain in the car due to the tendency of the pulverant material to compact as it converges in its flow toward the relatively small hopper openings or ports 28. When air under pressure is supplied to the plenum chambers 44 of the individual hopper funneling portions, the air immediately emerges from the gas permeable strips 46 on four sides of each hopper opening. Since the lower ends of the strips 46 are uncovered, or at least closely adjacent the arch indicated at 64, air initially will emerge approximately in the directions of arrows 66 and be directed diagonally upwardly and against the center portion of the arch, with air flow along the entire lengths of the respective strips 46 then taking place. Since the gas permeable strips 46 are relatively wide, the gas is emitted in a band-like jet or blast and the jets or blasts of each funneling portion are disposed in substantially upright planes, at least some of which intersect each other within the body of pulverant material (see FIGURE 2). These jets or blasts of each hopper funneling portion, because of the inclination of corners 40 with respect to the horizontal, tend to converge above the center of the hopper opening somewhat as indicated in FIGURE 16; in accordance with this invention, the rate of air movement is such that the strata of pulverant material in the path of the respective jets or blasts is physically moved upwardly and toward the center of the hopper to define (in the embodiments of FIGURES 1–24) a substantially X-shaped swath through the body of pulverant material above a particular hopper opening. This frees the pulverant material adjacent the swaths cut by the blasts from the side pressures that would otherwise be exerted by the removed material due to the weight of the pulverant mass and the wedging of same because of the convergent flow paths defined by bottom sheets 22, 24 and 26.

The rapid volume flow of the air from the plenum chambers 48, when air under pressure is initially supplied to the respective chambers 48, effects an immediate enlargement of the arch on the order of that indicated by broken line 68 in FIGURE 17. This in turn effects an immediate disruption of the arch so that the center of the arch structure formed by the pulverant materials falls through the hopper opening. Continued emission of the gas from the strips 46 effects a further passage of air upwardly through the center of the pulverant material as indicated by arrows 70 which prevents the arch structure from again forming. At the same time, the band-like gas air flows or blasts emitting from the upper portions of the plenum chambers 48 overcome the tendency of the pulverant material to compact as it moves toward and along the corners 36 on its way toward the hopper opening 28 since the air blasts in effect sever the converging pulverant material flows (which individually follow the respective paths dictated by the angulation of the respective flow and hopper sheets 22, 24 and 26) from frictional and wedging engagement with each other.

Looking at this pulverant material discharge phenomenon from another point of view, the band-like swaths that are cut through the mass of pulverant material in the respective hopper funneling portions (and that form the above referred to X-shaped swath) serve to segregate or subdivide that mass into a plurality of separate segments, and for each of the respective hopper funneling portions, each of such segments is less than one-half of the total mass of material in the respective hopper funneling portions (see FIGURES 2 and 16) or, the outer transverse perimeter of each of such segments is less than one-half the transverse outer perimeter of the whole, with the plane or surface of demarcation at the separation between adjacent of such segments (as defined by the aforesaid upright planes of band-like jets or blasts), extended or projected, if necessary, substantially intersecting the discharge opening of the respective hopper funneling portions, with the result that the internal pressures within the mass of material in each hopper funneling portion are relieved, and the separated segments of the respective hopper funneling portions fall by gravity through the respective discharge openings.

As soon as it is apparent that the arch structure formed by the pulverant material has been destroyed, air under pressure is supplied to the plenum chambers 44 along the sides of the car. These plenum chambers by reason of the gas permeable strips 42 each emit a band-like air flow or jet which breaks up the pulverant material along the bases of the respective side walls and establishes an air flow that tends to slice the pulverant material above the respective side wall bases away from the side walls. The result is that any drag that the car side walls might otherwise effect on the flow of the pulverant material toward the hopper openings is completely overcome.

Air under pressure is supplied to the plenum chambers 44 and 48 until the flour is fully discharged from the hopper openings 28. Arrows 66 of FIGURE 16 indicate the approximate direction of the air that escapes from plenum chambers 48 while arrows 67 indicate the approximate path of movement of the air escaping from plenum chambers 44.

It has been found that hopper cars of the type shown at 10 as well as other hopper or bin structures may be fully discharged by applying the principles above described and hereafter outlined in detail, without requiring mechanical devices or other aids.

*Specific Description*

The railroad car 10 illustrated includes a conventional underframe 80 including the center sill 32, side sills 82, end sills 84 and the other illustrated structural members employed for purposes of strengthening the car body and adapting it for supporting the hopper structure 90 formed by compartments 12 and 14. The car 10 also includes end frames 92 and roof structure 94, and the usual truck and bolster structures (not shown) employed in railroad cars of this type, all of which may be assembled in any conventional manner. The roof structure 94 includes hatchways 96 that are closed by suitable covers 98 pivoted to the roof structure and provided with appropriate releasable latching devices 100. The pulverant material is supplied to the compartments 12 and 14 through the hatchways 96 in accordance with standard practices.

FIGURE 4 shows one of the hopper openings or ports 28 employed in FIGURES 2–5, as it appears from a position below it. In the embodiment of FIGURES 2–5, the hopper openings are closed by plates 101 (see FIGURES 5 and 6) secured to the car by appropriate bolts received in holes 103 of flanges 105. Bolts 107 are provided for application of a suitable adaptor that is attached to a conduit for conveying the pulverant material where desired.

The plates 101 serve as gates and are removed by withdrawing their securing bolts. Alternatively, a suitable mechanically movable gate structure, such as that ordinarily applied to the PS-2 car above referred to may be employed (where indicated at 109 in FIGURE 1), though the gate structure of FIGURE 15 (hereinafter described) is preferred.

It should be understood, however, that the car 10 to which the invention is shown applied, is employed for illustrative purposes only, since my invention may be readily applied to most standard hopper cars as well as other hopper forming structures.

The plenum chambers 44 in addition to the gas permeable strips 42 each comprise a pair of clips 102 (see FIGURE 7) which extend lengthwise of corners 38 and secure the longitudinally extending sides of the strips 42 in place. The clips 102 are secured to the side and floor sheets 18 and 22 (or 26), respectively, and include a base portion 104 which is fixed to the respective car sheets in any suitable manner as by plug welding at 106. The bases 104 merge into longitudinally extending arched portions 110 that terminate in an elongated longitudinally extending edge 112 that is spaced somewhat from the adjacent hopper structure sheet. Each arched portion 110 of the respective clips forms a chamber 114 to receive the beaded sides 116 of the individual gas permeable strips. One of the gas permeable strips is shown in FIGURES 18 and 19 wherein it will be seen that the strips are formed by a woven fabric 118 having its longitudinally extending sides turned over to receive a cord 120 and stitched in place by suitable stitching 122. In a preferred embodiment, the fabric material 118 is 8 oz. duck canvasing and the cord 120 is formed from a suitable plastic material and provided with a metallic core 133 in the form of wire for reinforcing purposes.

At the ends of the clips 102 that are positioned adjacent either the car end sheets 20 or divider sheet 16, a base strip 124 is welded across the clips 102 and to the transversely extending hopper plate surface (see FIGURE 7a) as at 125. This plate is formed with appropriate tapped openings 126 to receive screws 127 (see FIGURE 5) that are employed to fix securing strip 128 across the upper end of the fabric strip 42 (which is omitted in the showing of FIGURE 7a). As already mentioned, the clips 102 engage the beaded edges 116 of the gas permeable strips 42, this being done by inserting the beaded edges underneath the arched portion of the clips 102 (at the lower ends thereof after the clips have been fixed in place) and then sliding the strips 42 lengthwise of the clips and upwardly until they extend over base strips 124 after which securing strips 128 are secured in place by applying screws 127.

At the lower end of the strips 42 (see FIGURE 11), transition plates 130 are welded to the car side wall 18, floor or slope sheet 22 (or 26) and hopper forming sheet 24 between the points 131 on each side thereof. The end 132 of the respective transition plates extends over the lower ends 133 of clips 102 and is welded to the clip arched portions 110. The sides of transition plate 130 are cut away sufficiently as at 135 to permit the edges 116 of strips 42 to be inserted under clips 102 at this point, and to permit the lower ends of strips 42 to overlie appropriate tapped holes 134 (see FIGURE 8) formed in transition plates 130 which receive appropriate screws 136 that are employed to hold securing plates 138 against the said lower ends of the canvas strips 42.

The plenum chambers 48 are of similar construction and employ clips 102a that are fixed in position as described above and have the same shape as clips 102 but are proportioned in length to be accommodated along the corners 40. At the sides of the car, the end 137 of the respective transition plates extends over and is welded to the arched portions 110a of clips 102a, plate 130 being cut away as at 139 to permit application of strips 46 to these clips 102a. The gas permeable strips 46 are applied to the clips 102a extending along the sides of the car by having their edges 116 inserted under arched portions 110a and then sliding the strips lengthwise of the clips until the clips are covered. The upper ends of these strips 46 are secured to transition plates 130 by securing plates 140 held in place by suitable screws 142 received in tapped holes formed in ends 137 of the respective transition plate 130.

At the center sill ridge of the hopper structure, the clips 102a there applied pass underneath transition plates 144 (see FIGURE 12) which include triangular side portions 146 and 148 that are secured (as by welding) between the center sill ridge 30 and the respective floor sheets 22 or 26. The respective transition plates 144 include a base plate 147 fixed to lower the lower edges 149 thereof and to the arched portions 110a of clips 102a (as by welding). Plates 147 are formed with tapped holes 151 to receive suitable securing screws 150 that are to fix securing plates 152 in place against the upper ends of the gas permeable strips 46 that extend along the center sill ridge. Transition plates 144 include triangular extensions 153 (welded thereto as at 155) that are fixed in place (see FIGURE 12) to sealingly engage the center sill ridge and the adjacent clips 102a, and yet permit application of the gas permeable strips 46 to their clips 102a. This may be done by forming the extensions 153 with appendages 157 (see FIGURE 9) that lie in the plane of the adjacent sheets 24 and are welded to the base 110a of the clips that are fixed to the latter (see FIGURES 12 and 12a wherein the gas permeable strips and their securing plates are omitted for clarity of illustration).

The clips 102a along the center sill ridge at their lower ends are secured to triangular plates 154 (see FIGURES 5 and 13) that are welded between the hopper forming sheets and the floor sheets respectively. The lower ends of the clips 102a are received under and welded to the ends 156 of triangular plates 154, said ends 156 being formed with tapped holes 159 to receive screws 160 fixing securing plates 158 in place against the lower ends of gas permeable sheets 46. This arrangement is also employed at the lower ends of the clips 102a along the sides of the car.

The plenum chambers 48 at the center sill ridge each include a plate 162 (see FIGURES 9 and 12a) welded across the upwardly facing surfaces of clips 102a at the upper ends thereof as well as to the adjacent edges 149 of transition plates 144. Plates 162 on either side of the respective transition plates 144 serves as baffles that restrict air flow (longitudinally of the plenum chambers) adjacent the gas permeable fabrics 46 (at said transition plates) but define openings 163 that (together with the space 165 under transition plates 144) connect the plenum chambers on each side of the center sill ridge together. The flow restricting function of plates 162 insures a maximum gas jet action through the upper ends of these fabrics 46.

The gas permeable strips 46 are applied to form the plenum chambers 48 along the center sill ridge by slipping their beaded edges 116 under the ached portions 110a of clips 102a at either end of the corners 36, and sliding the respective strips 46 longitudinally of the clips until they are completely covered. Securing plates 152 and 158 are then applied over the ends of the respective strips 46.

The lower ends of the plenum chambers 44 are completely closed off by a divider plate 166 (see FIGURES 8 and 10) that is welded to the individual clips 102 as well as the adjacent hopper structure plates 18 and 22.

In the embodiments of FIGURES 1–6, the hopper openings are defined by laterally extending flanges 170 (see FIGURES 4 and 6) where the hopper opening or port is so arranged. I prefer to apply, adjacent each side of the hopper opening (see FIGURE 6), between converging pairs of plenum chambers 48 and over flanges 170, a pair of relatively small plenum chambers 172 which are thus positioned on either side of the hopper opening. The chambers 172 are each formed by upper and lower rectangular brackets 174 and 176 (see FIGURES 6 and 13), respectively, the lower bracket being welded in place between the lowermost end of the adjacent hopper floor sheet and the short vertical hopper port forming sheets 178. The brackets 174 and 176 are each formed with a large opening 180 and a strip of gas permeable material 182 (similar to that already described but having beadless edges) is secured between them, these brackets being held together by appropriate screws 184. Plenum chambers 172 supplement the action of the other plenum chambers and keep the pulverant material from building up on flanges 170.

The plenum chambers 44, 48 and 172 may be supplied with air under pressure in any suitable manner. As indicated in FIGURES 2, 3, 5 and 13, suitable piping may be applied to the outer surface of the floor sheets where indicated at 190 and 192, the piping extending across (transversely of) the car and joined at each side of the car (as by piping 193) to common fittings 194 (see FIGURE 5) which may be closed by a suitable closure, such as pipe cap 196, when not in use. The piping 190 and 192 communicate with the respective chambers 48 through suitable openings 196 (see FIGURE 13) formed in the floor sheets of the hopper core or in any other suitable manner. The compressed air is supplied to chambers 44 through extension piping 198 provided with appropriate hand valves 200 so that the compressed air may be supplied to the chambers 44 after it is supplied to the chambers 48. Plenum chambers 172 are supplied with air through extensions 201 that communicate between the respective piping 190 and 192 and ports 203 formed in floor sheets 22 and 26 (see FIGURE 13). No special valving is required for any of this piping and air may be supplied to fittings 194 in any suitable manner.

FIGURE 15 illustrates an improved hopper port control gate that may be employed in the hopper car 10. In this embodiment of the invention, the plenum chambers 172 and their associated structures of FIGURES 4, 6 and 13 are omitted and a pair of vertically spaced guide bars 208 are positioned on each side of a tubular adaptor structure 207 applied to sheets (to define the hopper opening 28a) to form a trackway for sliding panel 210, which operates in slot 213 formed in adaptor structure 207 and is movable from the solid line position of FIGURE 15 to the broken line position by grasping handle 212. Lock pin 214 secured in place by chain 216 may be employed to lock the sliding panel 210 in place by being received through perforation 217 of the panel and perforations 218, 220 and 221 that are formed in plates 222, 224 and 225 that are fixed to the hopper structure. The gate of FIGURE 15 also includes a closure plate 226 secured in place to flanges 228 of the adaptor structure by appropriate bolts 230. The pin 214 may be formed as at 232 to receive a suitable car seal 234 for sealing the core during transit. The inner end 233 of panel 210 slidably engages seal forming bar 235, an elongate member 237 being fixed to the under surface of panel 210 to serve as a stop that engages bar 235 to limit inward movement of the panel.

Adaptor structure 207 is quadrilateral in cross-sectional configuration, to provide a port opening 28a that is similar in shape to port 28. Panel 210 is of corresponding configuration, and guide bars 208 are positioned on opposing side walls 239 of adaptor 207.

The sliding panel serves as a door for effectively closing the hopper port, while the closure 226 effectively seals the contents of the hopper from contamination. A suitable gasket 238 may be employed between the flanges 228 and the closure 226.

The showing of FIGURE 17 employs the embodiment of FIGURE 15, although the gate has been omitted for clarity of illustration.

It will be apparent that the principles of my invention are not limited to railroad cars, FIGURES 23 and 24 showing the invention applied to stationary hoppers that may be mounted in any suitable support in a storage yard, etc. The hopper 250 of FIGURES 23 and 24 is composed of vertical side walls 252 joined to downwardly inclined hopper forming sheets 254 to form downwardly formed corners where indicated at 256. In accordance with my invention, plenum chambers 258 are installed in the corners 256, the plenum chambers 258 corresponding in structure to plenum chambers 48 including the clips 102a, the fabric strips 46, the lower triangular closure plates 154 and securing strips 158; at their upper ends the plenum chambers 258 include triangular closure plates 154a that are similar in structure to closure plates 154. Securing strips 158a are applied to the upper ends of the plenum chambers 258 to secure the ends of the gas permeable strips in place.

As shown in FIGURE 23, a similar plenum chamber 258a may be applied to the horizontal corners 256a (as may a similar chamber be applied to horizontal corners 261 of the railroad car of FIGURES 1-19, though this has been found to be not essential to efficient operation of such car).

The hopper 250 may be mounted on suitable supports 260 of any suitable type, the hopper being positioned to receive a charge of pulverant material and discharge it into a vehicle or the like that is positioned underneath hopper opening 262. Control gates and the like are not shown in FIGURE 23 for simplicity of illustration, though any suitable type of gate may be employed.

The plenum chambers 258 and 258a of the embodiment of FIGURES 23 and 24 may be supplied with gas, such as air, under pressure in any suitable manner, as will be obvious to those skilled in the art, suitable piping being diagrammatically indicated in the drawings.

It will therefore be seen that I have provided a simplified method and apparatus for securing complete discharge of pulverant material from hoppers, and thus have solved a long standing problem in the art of handling pulverant material. The invention eliminates the need for mechanical vibrators or the use of sledge hammers to effect discharge with consequent reduction in strength requirements for the hopper car structure. The invention may be applied to hopper cars with very little modification of their conventional design.

The gas permeable material employed is preferably of the type specified above and has a permeability that exceeds 10, as determined by the standard permeability test (13.9 being the permeability of the canvas material employed in a successful embodiment of the invention). This test determines the amount of air measured in cubic feet at 70 degrees and 20 percent relative humidity which will pass through one square foot of dry permeable material in one minute when tested under an equivalent pressure differential of two inches of water. While the canvasing material specified is preferred, other porous material such as porous stone, perforated plates, or the like may be employed. The slope of the hopper sheets employed should exceed the angle of repose of the material to be held in the hopper or bin for best results.

In the railroad car illustrated, which was designed for handling flour, floor sheets 22, 24 and 26 have a slope on the order of 50 degrees and fabric strips 42 and 46 are on the order of seven inches wide, their lengths depending on the design of the car to which they are applied. All metal parts that are exposed to the flour, such as securing plates 128, 138, 140, 152 and 158, panel 210 of FIGURE 15, and bracket 174 of FIGURE 13 are formed from aluminum. Air preferably should be supplied to the individual plenum chambers at a minimum rate that is on the order of 12 cubic feet per minute per square foot of plenum chamber gas permeable area as this insures the physical movement, contemplated by this invention, of the pulverant material strata that is in the path of the jets or blasts. An air compressor driven by a five horsepower motor will develop and maintain the volume flow necessary for good operating conditions. The clips 102 and 102a are made from 1/16th inch sheet metal and include bases 104 and 104a that measure one inch in width, and arched portions 110 and 110a are struck on a radius on the order of 1/4th inch.

While the illustrated car was designed for handling flour, materials such as cement, lime, graphite, etc. may also be handled with equal facility. The invention may be applied in handling any pulverant material, that is, any small particuled material that tends to arch or pack when confined within a hopper or bin-like structure and when discharge is through an opening that is smaller than the cross section of the bin. Of course, the necessary angle of inclination of the bin floor or hopper forming surfaces will depend on the angle of slide of a particular material being handled, but the angulation mentioned above will be found satisfactory for most materials.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A plenum chamber for railroad cars and the like comprising two imperforate surfaces intersecting to form a corner, a clip fixed to each surface and extending longitudinally of said corner, said clips each comprising a base portion on one side thereof that is fixed to the respective surfaces adjacent said corner and an arched portion on the other side thereof projecting away from said corner and terminating in an edge that extends longitudinally of said corner and is spaced closely adjacent the respective surfaces, a gas permeable fabric strip secured to said clips and overlying same, said strip extending longitudinally of said clips and being formed with a bead along its longitudinally extending edges, said beads being received under the arched portions of said clips to dispose said strip across said corner, means for supplying gas under pressure to said chamber, and means for closing the ends of said chamber.

2. The plenum chamber set forth in claim 1 wherein a base plate is fixed between said clips at each end thereof, said fabric strip extending over the respective base plates, and wherein a securing plate is fixed across each base plate to secure the ends of said fabric strip in place.

3. A hopper structure for pulverant materials comprising a pulverant material confining wall structure including a lower funneling portion forming a discharge port and defined by portions of said wall structure inclined with respect to the horizontal at an angle that is at least equal to the angle of slide of the pulverant material, and means for discharging pulverant material by gravity from said structure even when compacted in said funneling portion, said means including a plurality of band-like gas plenum chambers mounted in said funneling portion and constructed and arranged so that the gas discharged therefrom is in bands and is directed inwardly and upwardly within said funneling portion, with said bands intersecting within said wall structure to effectively segregate the mas of pulverant material within said funneling portion into segments each of which is less than one-half of the mass of pulverant material within said funneling portion and with a plane of separation between adjacent of said segments substantially intersecting said discharge port, said plenum chambers each including a covering of gas permeable material having a permeability that exceeds 10, and means for supplying gas under pressure to said plenum chambers at a sufficient rate such that said bands, respectively, will discharge from said gas permeable material of the respective plenum chambers at a sufficient volume and velocity to physically move the strata of pulverant material in the path of the bands toward the center of the hopper to form said segments and thereby free material adjacent the strata from the side pressure of said removal material, whereby said freed material may slide downwardly along said funneling portion surfaces.

4. A hopper structure for pulverant materials comprising a pulverant material confining wall structure including a lower funneling portion forming a discharge port and defined by planar surfaces inclined to the horizontal at an angle that is at least equal to the angle of slide of the pulverant material, said planar surfaces defining downwardly inclined corners at their intersections, and means for forming a gas blast along said corners, directed into the pulverant material and of sufficient capacity to cut a swath through the pulverant material outwardly and lengthwise of said corners in generally upright planes some of which intersect each other, whereby material adjacent said swath is freed from the side pressure of the material displaced by forming the swath, thereby permitting said freed material to slide downwardly along said bottom surfaces.

5. In a hopper structure adapted for containing pulverant materials, said hopper structures including a side wall structure and planar downwardly inclined bottom surfaces that lead to the hopper discharge port, said surfaces forming downwardly inclined lines of intersection defining corners, the improvement wherein said bottom surfaces have an angle of inclination with respect to the horizontal that is at least equal to the angle of slide of the pulverant material and wherein the hopper sructure includes means for forming a gas jet blast diagonally outwardly of and along said corners, of sufficient volume and velocity to physically move the strata of pulverant material in the path of the blasts to the center of the hopper structure to thereby free material adjacent said blasts from the side pressure of said removed material, whereby said freed material may slide downwardly along said bottom surfaces.

6. In a hopper structure adapted for containing pulverant materials and defined by planar side walls and planar downwardly inclined bottom surfaces that lead from the side walls to the hopper discharge port, said surfaces forming downwardly inclined lines of intersection defining corners, the improvement wherein said bottom surfaces have an angle of inclination with respect to the horizontal that is at least equal to the angle of slide of the pulverant material, wherein a gas permeable material is applied across said corners to define a band-like plenum chamber between said material and the respective corners, said gas permeable material having a permeability that exceeds 10, and including means for supplying gas under pressure to said plenum chambers at a sufficient rate to establish a band-like blast through said gas permeable materials at a volume and velocity to physically move the strata of pulverant material in the path of the blasts to the center of the hopper structure to thereby free material adjacent said blasts from the side pressures of said removed material, whereby said freed material may slide downwardly along said bottom surfaces.

7. In a railroad hopper car including a hopper structure adapted for containing pulverant materials with the hopper structures being defined by side walls and planar downwardly inclined bottom surfaces that lead from the side walls to the hopper discharge port, said surfaces forming downwardly inclined lines of intersection defining corners, the improvement wherein said bottom surfaces have an angle of inclination with respect to the horizontal that is at least equal to the angle of slide of the pulverant material, wherein a gas permeable material is applied across said corners to define a plenum chamber between said gas permeable material and the respective corners, said gas permeable material having a permeability that exceeds 10, and including means for supplying gas under pressure to said plenum chambers at a sufficient rate to establish a band-like blast through said gas permeable materials at a volume and velocity to physically move the strata of pulverant material in the path of the blasts to the center of the hopper structure to thereby free material adjacent said blasts from the side pressures of said removed material, whereby said freed material may slide downwardly along said bottom surfaces.

8. The hopper car set forth in claim 7 wherein a plenum chamber is formed on either side of said port and closely adjacent same, said plenum chambers each being closed by a relatively short length of gas permeable material having a permeability that exceeds 10, the last mentioned plenum chambers being disposed between converging pairs of said corners, and means for supplying gas under pressure to said last mentioned plenum chambers.

9. The hopper car set forth in claim 7 wherein said discharge port comprises a sliding horizontally disposed panel riding on a trackway formed in said port, said panel operating in slot means formed in said hopper structure, pin means for releasably locking said panel in closed position, and an imperforate sealing member detachably secured to said port below said panel.

10. In a railroad hopper car including a hopper structure adapted for containing pulverant materials with the hopper structure being defined by side walls, planar downwardly inclined bottom surfaces, and a center sill ridge, said surfaces extending from said side walls and said ridge to spaced hopper discharge ports on either side of said ridge, said surfaces forming downwardly inclined lines of intersection defining corners on either side of said ridge, the improvement wherein said bottom surfaces have an angle of inclination with respect to the horizontal that is at least equal to the angle of slide of the pulverant material, wherein a gas permeable material is applied across said corners to define a plenum chamber between said gas permeable material and the respective corners, said permeable material having a permeability that exceeds 10, and including means for supplying gas under pressure to said plenum chambers at a sufficient rate to establish a band-like blast through said gas permeable materials at a volume and velocity to physically move the strata of pulverant material in the path of the blasts to the center of the hopper structure to thereby free material adjacent said blasts from the side pressures of said removed material, whereby said freed material may slide downwardly along said bottom surfaces.

11. The hopper car set forth in claim 10 wherein the plenum chambers of intersecting corners are connected by transition plate means overlying the corner intersections.

12. A hopper structure for pulverant materials comprising a pulverant material confining wall structure including a lower funneling portion forming a discharge port and defined by portions of said wall structure inclined with respect to the horizontal at an angle that is at least equal to the angle of slide of the pulverant material, and means associated with said funneling portion for discharging the pulverant material by gravity through said discharge port, said means including means for forming substantially rectilinear swaths through the pulverant material within said funneling portion along substantially vertical planes that intersect through said discharge port and which effectively divide said pulverant material in the funneling portion into segregated segments each of which contains less than one-half of the mass of pulverant material in the funneling portion.

13. A hopper structure comprising a walled enclosure adapted to contain pulverant material, which enclosure includes a lower funneling portion having a gravity discharge port at its lower end, with the wall structure defining said funneling portion being inclined with respect to the horizontal at an angle that is at least equal to the angle of slide of the pulverant material in the enclosure, and means for freeing compacted pulverant material in said funneling portion whereby it may flow by gravity through the discharge port, said means including means for directing intersecting band-like blasts of air from the sides of said funneling portion inwardly and upwardly through the pulverant material whereby the pulverant material in the funneling portion is effectively segregated into isolated segments of said material, each segment of which is less than one-half of the total mass of said material in said funneling portion thus permitting the separated segments to flow by gravity through said discharge port.

14. In a hopper structure adapted to contain pulverant material, the combination of a walled enclosure having a lower funneling portion merging with a gravity discharge port at its lower end, the walls of said funneling portion having an angle of inclination with respect to the horizontal that is at least equal to the angle of slide of the pulverant material contained in the enclosure, and means for destroying arches of pulverant material that may be formed in the funneling portion of the enclosure due to compaction therein whereby, with the arches destroyed, the material may flow by gravity through said discharge port, said means including means for physically moving a plurality of intersecting band-like portions of said pulverant material inwardly and upwardly along generally planar paths, the plane of one of said paths substantially intersecting the discharge port to thereby destroy said arches and to isolate segments of the pulverant material from each other, with each segment including less than one-half of the transverse perimeter of the mass of said material in said funneling portion whereby the individual segments may flow downwardly by gravity along the walls of said funneling portion and through the discharge port.

15. In a hopper structure adapted to contain pulverant material, a walled enclosure having a lower funneling portion merging with a gravity discharge port at its lower end with the wall structure defining said funneling portion having an angle of inclination with respect to the horizontal that is at least equal to the angle of slide of the pulverant material contained in the enclosure, and means for insuring discharge of pulverant material through said port, said means including means for physically segregating the mass of pulverant material in said lower funneling portion into a plurality of contiguous segments, each of which has an outer periphery defined by the hopper funneling portion that is less than one-half of the total transverse periphery of the material in said funneling portion, and with a plane of separation between adjacent segments that substantially intersects said gravity discharge port.

16. A hopper structure comprising a walled enclosure adapted to contain pulverant material, which enclosure includes a gravity discharge port at its lower end, the walls of said enclosure including two intersecting planar walls, at least one of said walls and the line of intersection therebetween having an angle of inclination with respect to the horizontal that is at least equal to the angle of slide of the pulverant material that is placed in the enclosure, and means for facilitating discharge of pulverant material from said enclosure by gravity through said discharge port, said means including a plenum chamber having a gas pervious outlet along the intersection of said planar wall and means for delivering gas under sufficient pressure through said plenum chamber outlet and upwardly and inwardly through said pulverant material to break compacted arches of said material in the area of said intersection.

17. The method of removing pulverant material from a hopper having a lower funneling portion provided with a discharge opening at its lower end defined by a wall structure that is inclined with respect to the horizontal at an angle that is at least equal to or greater than the angle of slide of the pulverant material, said method including continually cutting a plurality of substantially vertical swaths through the mass of pulverant material in said lower funneling portion to effectively segregate said last mentioned mass into segments each of which is less than one-half of said last mentioned mass and with a plane of separation between adjacent segments substantially intersecting said discharge opening, whereby said material will flow by gravity through said discharge opening.

18. The method of removing pulverant material from a hopper having a lower funneling portion provided with a discharge opening at its lower end defined by a wall structure that is inclined with respect to the horizontal at an angle that is at least equal to or greater than the angle of slide of the pulverant material, said method including continually cutting an X-shaped swath through the mass of pulverant material in the funneling portion of the hopper, the individual swaths of which lie along substantially vertical planes that intersect adjacent said discharge opening, whereby said material will flow by gravity through said discharge opening.

References Cited in the file of this patent

UNITED STATES PATENTS

| | | |
|---|---|---|
| 1,746,395 | Herdemerten | Feb. 11, 1930 |
| 1,946,780 | Costello | Feb. 13, 1934 |
| 1,971,852 | Goebels | Aug. 28, 1934 |
| 2,527,455 | Schemm | Oct. 24, 1950 |
| 2,589,968 | Schemm | Mar. 18, 1952 |
| 2,609,125 | Schemm | Sept. 2, 1952 |
| 2,785,018 | McKenna | Mar. 12, 1957 |
| 2,815,987 | Sylvest | Dec. 10, 1957 |
| 2,829,007 | Van Wavern | Apr. 1, 1958 |

UNITED STATES PATENT OFFICE
CERTIFICATE OF CORRECTION

Patent No. 3,069,206                      December 18, 1962

Jack W. Borger

It is hereby certified that error appears in the above numbered patent requiring correction and that the said Letters Patent should read as corrected below.

Column 12, line 7, for "removal" read -- removed --.

Signed and sealed this 2nd day of July 1963.

(SEAL)
Attest:

ERNEST W. SWIDER
Attesting Officer

DAVID L. LADD
Commissioner of Patents